US011258328B2

(12) United States Patent
Song et al.

(10) Patent No.: US 11,258,328 B2
(45) Date of Patent: Feb. 22, 2022

(54) MOTOR WITH FLAT WIRE (71) Applicant: DK Innotech Co., Yangsan-si (KR)

(72) Inventors: Myong-Ken Song, Yangsan-si (KR);
Gyu-Won Cho, Yangsan-si (KR);
Byung-Ho Seol, Busan (KR);
Chang-Yong Sim, Busan (KR);
Seung-Oh Ryu, Busan (KR)

(73) Assignee: DK Innotech Co., Yangsan-si (KR)

( * ) Notice: Subject to any disclaimer, the term of this patent is extended or adjusted under 35 U.S.C. 154(b) by 92 days.

(21) Appl. No.: 16/663,306

(22) Filed: Oct. 24, 2019

(65) Prior Publication Data

US 2020/0161923 A1 May 21, 2020

(30) Foreign Application Priority Data

Nov. 15, 2018 (KR) .................. 10-2018-0140781

(51) Int. Cl.
*H02K 3/50* (2006.01)
*H02K 1/16* (2006.01)
*H02K 21/14* (2006.01)
*H02K 3/14* (2006.01)
*H02K 1/27* (2022.01)

(52) U.S. Cl.
CPC ............... *H02K 3/50* (2013.01); *H02K 1/16* (2013.01); *H02K 1/278* (2013.01); *H02K 3/14* (2013.01); *H02K 21/14* (2013.01); *H02K 2203/06* (2013.01)

(58) Field of Classification Search
CPC ............ H02K 1/16; H02K 1/165; H02K 1/18; H02K 1/185; H02K 1/278; H02K 3/14; H02K 3/50; H02K 21/14; H02K 2203/06

USPC ......................................................... 310/179
See application file for complete search history.

(56) References Cited

U.S. PATENT DOCUMENTS

| 8,745,847 | B2 | 6/2014 | Stephenson |
| 9,641,036 | B2 * | 5/2017 | Tsuiki ............... H02K 3/28 |
| 2005/0280328 | A1 * | 12/2005 | Neet ............... H02K 3/345 310/214 |
| 2007/0222323 | A1 * | 9/2007 | Neet ............... H02K 15/10 310/215 |
| 2012/0007460 | A1 * | 1/2012 | Kitamura ......... H02K 15/045 310/195 |
| 2012/0169163 | A1 * | 7/2012 | Imai ............... H02K 21/14 310/71 |

FOREIGN PATENT DOCUMENTS

KR   101803879 B1 * 12/2017

OTHER PUBLICATIONS

Jung et al., English Machine Translation of KR 101803879B1 (Year: 2017).*

* cited by examiner

*Primary Examiner* — Tulsidas C Patel
*Assistant Examiner* — Rashad H Johnson (57) ABSTRACT A motor with a flat wire is provided. Since spatial collisions which occur in horizontal and vertical directions can be prevented by flat wire patterns which intersect with each other and are stacked on slots of a stator core, there is an advantageous effect in that a motor is miniaturized.

9 Claims, 8 Drawing Sheets

MOTOR WITH FLAT WIRE

CROSS-REFERENCE TO RELATED APPLICATION(S)

This application claims priority from Korean Patent Application No. 10-2018-0140781, filed on Nov. 15, 2018, in the Korean Intellectual Property Office, the disclosure of which is incorporated herein by reference in its entirety.

BACKGROUND

1. Field

The following description relates to a motor with a flat wire so as to increase a slot fill factor, and more particularly, to a motor with a flat wire having an advantage in that the size thereof is miniaturized by preventing a spatial collision between flat wire patterns.

2. Description of Related Art

In motors, round wires have typically been used because processes of winding coils through which a current flows are easy and standardized winding apparatuses are continuously used.

However, in the case of the round wire, a limit of a slot fill factor, which is a ratio of an area of copper (a coil) to an area of a slot of a stator, ranges from 45 to 50%, and the limit becomes a factor of increasing a size of a motor because an area of a dead space increases in an overall volume of the motor and a torque density decreases.

Recently, studies on using a flat wire instead of the round wire to maximize motor performance are being actively carried out. In particular, usability of the flat wire is very high for securing an output density and a current of a motor used in an apparatus such as a vehicle in which a weight and a voltage are limited.

U.S. Pat. No. 8,745,847 (Jun. 10, 2014) and the like disclose that flat wires are wounded around a stator. In the flat wires, unlike round wires, a plurality of flat wire patterns are inserted into and stacked on a plurality of slots formed in an inner circumference of a stator core to intersect with each other.

However, since the flat wire patterns should intersect with each other and be wound and connected without being electrically disconnected, spatial collisions occur in a horizontal direction at portions from which flat wire pattern stacking starts and flat wire pattern portions which meet the portions, and thus an area of a motor is increased.

In addition, spatial collisions occur in the horizontal direction and a vertical direction at end-coil portions in which the flat wire patterns intersect with each other, and thus the area and height of the motor are increased.

In addition, when the flat wire patterns are stacked on the plurality of slots formed in the inner circumference of the stator core, spatial collision occurs in the horizontal direction at exceptional portions such as power input terminals or power output terminals, and thus the area of the motor is increased.

Accordingly, it is very important to design a stack structure of the flat wire patterns capable of solving the spatial collisions in the horizontal and vertical directions occurring due to the flat wire patterns which intersect and are stacked on each other so as to develop a high performance motor using a flat wire.

RELATED ART

Patent Document

U.S. Pat. No. 8,745,847 (Jun. 10, 2014)

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a motor with a flat wire capable of preventing spatial collisions in horizontal and vertical directions due to flat wire patterns which intersect with each other and are stacked on slots of a stator core.

In one general aspect, a motor with a flat wire includes a stator core in which a plurality of teeth and slots are formed in an inner circumference thereof, a rotor which rotates about a center of an inner portion of the stator core as an axis and in which a plurality of magnets are attached to an outer circumference thereof, and flat wires which are inserted into and stacked on the plurality of slots formed in the inner circumference of the stator core to intersect with each other and include basic flat wire patterns each having a predetermined distance in pitch and modified flat wire patterns each having a distance in pitch which is different from that of the basic flat wire patterns to prevent a spatial collision in a horizontal direction at a position at which the flat wire pattern meets a flat wire pattern stacking start position.

Each of the basic flat wire patterns may include two straight flat wire elements which are inserted into the slots formed in the inner circumference of the stator core and have a distance of n pitches, one U- or V-shaped hair-pin element which is integrally connected to upper ends of the two straight flat wire elements to electrically connect the two straight flat wire elements, and in which a part of a central portion is twisted to prevent a spatial collision in the horizontal direction and a vertical direction between the intersecting flat wire patterns, and two welded elements in which one ends are integrally connected to lower ends of the two straight flat wire elements and the other ends are electrically connected to two adjacent flat wire patterns and which have a distance of n/2 pitches.

Each of the modified flat wire patterns may include two straight flat wire elements which are inserted into the slots formed in the inner circumference of the stator core and have a distance of n−1 or n+1 pitches, one U- or V-shaped hair-pin element which is integrally connected to upper ends of the two straight flat wire elements to electrically connect the two straight flat wire elements, and in which a part of a central portion is twisted to prevent a spatial collision in the horizontal and vertical directions between the intersecting flat wire patterns, and two welded elements in which one ends are integrally connected to lower ends of the two straight flat wire elements and the other ends are electrically connected to two adjacent flat wire patterns and which have a distance of n/2 pitches.

Both ends of the U- or V-shaped hair-pin element of the basic flat wire pattern or the modified flat wire pattern may be twisted to prevent a spatial collision in the horizontal and vertical directions between the intersecting flat wire patterns.

The two welded elements of the basic flat wire pattern or the modified flat wire pattern may be formed in opposite directions and used for forward-direction stacking or reverse-direction stacking.

The two welded elements of the basic flat wire pattern or the modified flat wire pattern may be formed in one direction and used at a portion in which a stacking direction is reversed from a forward direction to a reverse direction.

The motor may further include exceptional flat wire patterns which are stacked on separate layers which are different from stack layers on which the basic flat wire patterns and the modified flat wire patterns intersect and are stacked to prevent a spatial collision in a horizontal direction and to decrease the number of slot stack layers.

Each of the exceptional flat wire patterns may include a power input flat wire pattern connected to a power input terminal and a power output flat wire pattern connected to a power output terminal.

The power input flat wire pattern may include a straight flat wire element which is stacked on the separate layer which is different from the stack layers in which the basic flat wire patterns and the modified flat wire patterns intersect and are stacked and in which an upper end is connected to the power input terminal, and one welded element in which one end is integrally connected to a lower end of the straight flat wire element and the other end is electrically connected to the adjacent flat wire pattern and which has a distance of n/2 inches.

The power output flat wire pattern may include a straight flat wire element which is stacked on the separate layer which is different form the stack layers on which the basic flat wire patterns and the modified flat wire patterns intersect and are stacked, and in which an upper end is connected to the power output terminal and a lower end is electrically connected to the adjacent flat wire pattern.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, in order to facilitate understanding and embodiment by those skilled in the art, the present invention will be described in detail by explaining exemplary embodiments with reference to the accompanying drawings. Although specific embodiments are illustrated in the drawings and detailed explanations are described, the embodiments are not intended to limit embodiments of the present invention in the specific forms.

In the description of the invention, when it is determined that detailed descriptions of related well-known functions unnecessarily obscure the gist of the invention, the detailed descriptions thereof will be omitted.

It will be understood that when an element is referred to as being "connected" or "coupled" to another element, it can be directly connected or coupled to another element or intervening elements may be present.

In contrast, when an element is referred to as being "directly connected" or "directly coupled" to another element, there are no intervening elements.

Figure 1:
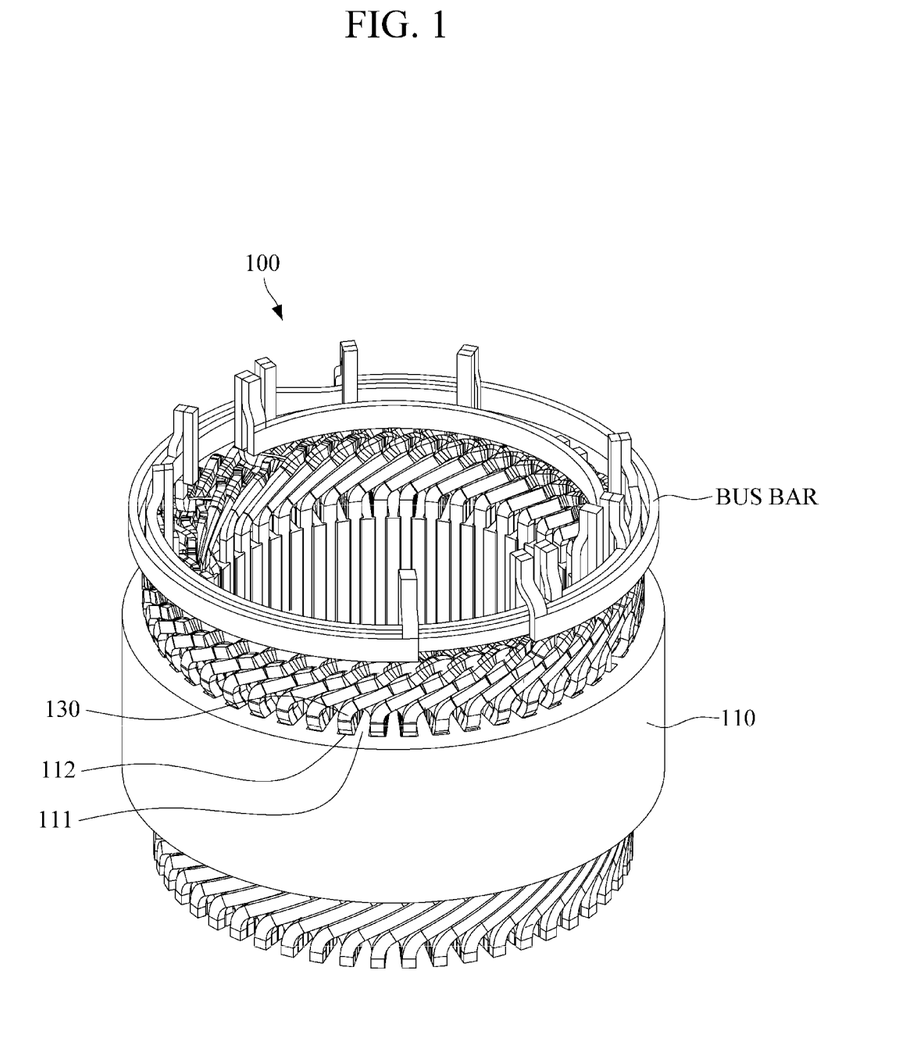
FIG. 1 is a perspective view illustrating a motor with a flat wire according to one embodiment of the present invention.

FIG. 1 is a perspective view illustrating a motor with a flat wire according to one embodiment of the present invention. As illustrated in the drawing, a motor 100 with a flat wire includes a stator core 110 in which a plurality of teeth 111 and slots 112 are formed in an inner circumference thereof, a rotor (not shown) which rotates about a center of an inner portion of the stator core as an axis and in which a plurality of magnets (not shown) are attached to an outer circumference thereof, and flat wires 130.

The flat wires 130 are inserted into and stacked on the plurality of slots 112 formed in the inner circumference of the stator core 110 to intersect with each other. The flat wires 130 include basic flat wire patterns 131 each having a predetermined distance in pitch, and modified flat wire patterns 132 each having a distance in pitch which is different from that of the basic flat wire patterns.

Figure 2:
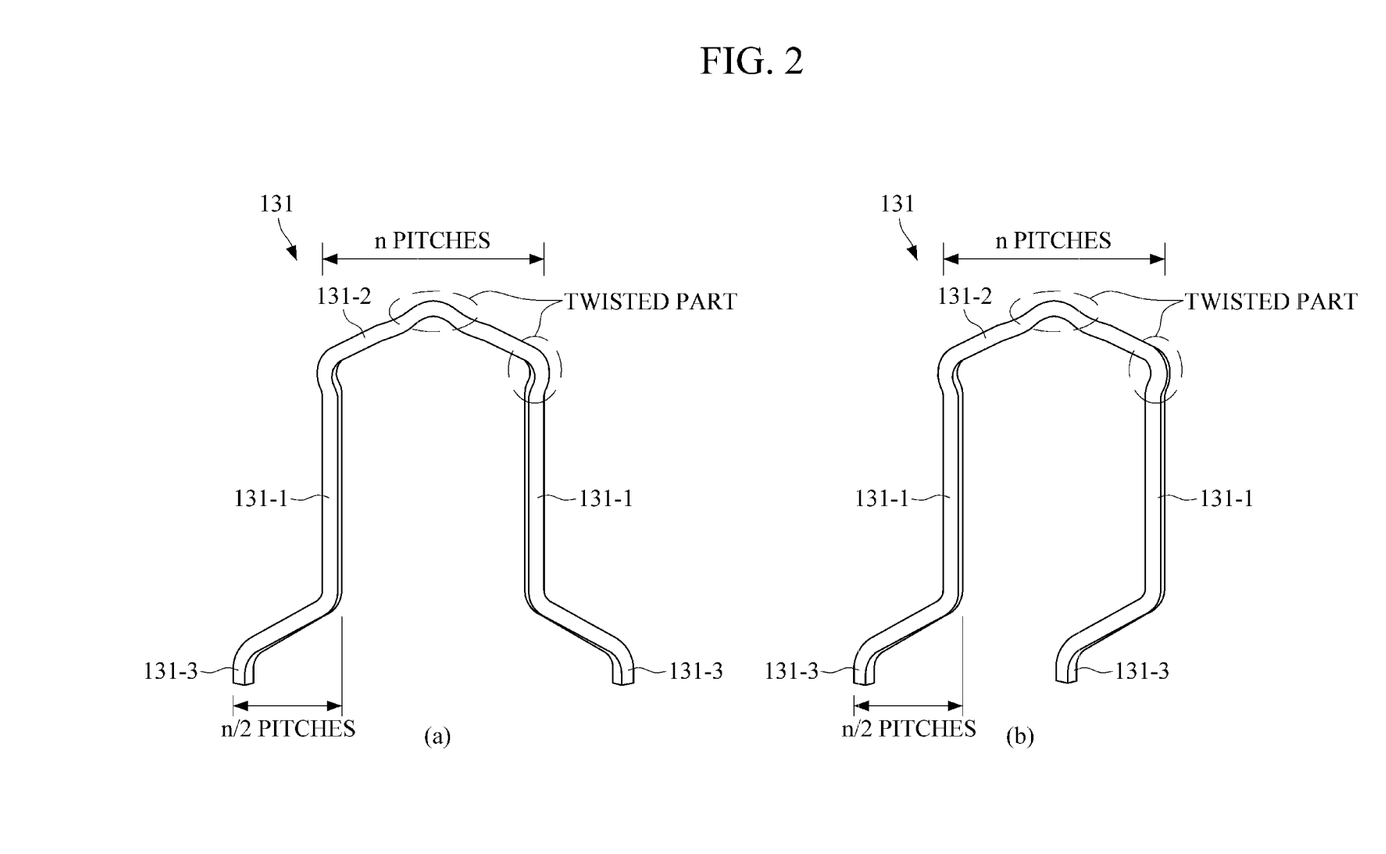
FIG. 2 is a view illustrating a basic flat wire pattern of the motor with a flat wire according to one embodiment of the present invention.

FIG. 2 is a view illustrating a basic flat wire pattern of the motor with a flat wire according to one embodiment of the present invention. As illustrated in FIG. 2, each of the basic flat wire patterns 131 includes two straight flat wire elements 131-1, one U- or V-shaped hair-pin element 131-2, and two welded elements 131-3.

The two straight flat wire elements 131-1 are inserted into the slots 112 formed in the inner circumference of the stator core 110 and have a distance of n pitches. The distance of n pitches means that the two straight flat wire elements 131-1 are formed to be spaced the distance of n pitches from each other. Here, n may be an even number.

The one U- or V-shaped hair-pin element 131-2 is integrally connected to upper ends of the two straight flat wire elements to electrically connect the two straight flat wire elements, and a part of a central portion thereof is twisted to prevent a spatial collision in horizontal and vertical directions between the intersecting flat wire patterns.

Since the central portion of the hair-pin element 131-2 is a portion in which the other flat wire pattern intersects therewith, a spatial collision occurs in the horizontal and vertical directions at the central portion of the hair-pin element 131-2, and thus an area and a height of the motor increase.

In order to solve such a problem, in the present invention, the part of the central portion of the hair-pin element 131-2 is twisted, and the twisted part is inserted into a twisted part of a central portion of the hair-pin element of the other flat wire pattern to prevent a spatial collision in the horizontal and vertical directions.

One ends of the two welded elements 131-3 are connected to lower ends of the two straight flat wire elements 131-1, and the other ends are electrically connected to the adjacent two flat wire patterns and have a distance of n/2 pitches. Here, the other ends of the two welded elements 131-3 are welded to the welded elements of the two adjacent flat wire patterns. The welding portion may be insulated using an insulating paper or material or the like.

Figure 3:
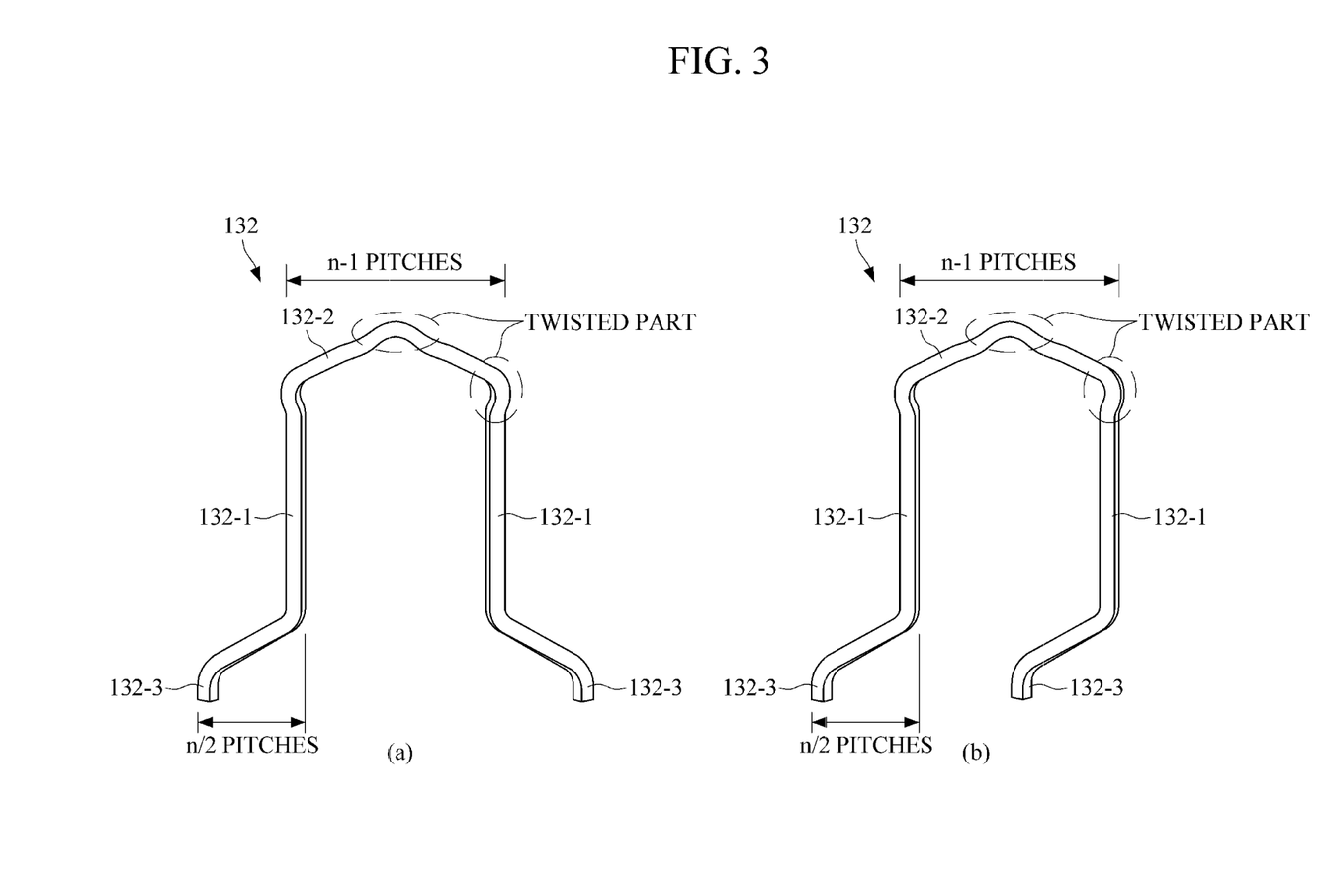
FIG. 3 is a view illustrating a modified flat wire pattern of the motor with a flat wire according to one embodiment of the present invention.

FIG. 3 is a view illustrating a modified flat wire pattern of the motor with a flat wire according to one embodiment of the present invention. As illustrated in FIG. 3, each of the modified flat wire patterns 132 includes two straight flat wire elements 132-1, one U- or V-shaped hair-pin element 132-2, and two welded elements 132-3.

The two straight flat wire elements 132-1 are inserted into the slots 112 formed in the inner circumference of the stator core 110 and have a distance of n−1 pitches or n+1 pitches. The distance of n−1 or n+1 pitches means that the two straight flat wire elements 132-1 are formed to be spaced the distance of n−1 or n+1 pitches from each other. Here, n may be an even number.

The one U- or V-shaped hair-pin element 132-2 is integrally connected to upper ends of the two straight flat wire elements 132-1 to electrically connect the two straight flat wire elements, and a part of the central portion thereof is twisted to prevent a spatial collision in the horizontal and vertical directions between the intersecting flat wire patterns.

Since the central portion of the hair-pin element 132-2 is a portion where the other flat wire pattern intersects therewith, a spatial collision occurs in the horizontal and vertical directions at the central portion of the hair-pin element 132-2, and thus an area and a height of the motor increase.

In order to solve such a problem, in the present invention, a part of the central portion of the hair-pin element 132-2 is twisted, and the twisted part is inserted into a twisted part of the central portion of the hair-pin element of the other flat wire pattern to prevent a spatial collision in the horizontal and vertical directions.

One ends of the two welded elements 132-3 are connected to lower ends of the two straight flat wire elements 131-1, and the other ends are electrically connected to the two adjacent flat wire patterns and have a distance of n/2 pitches. Here, the other ends of the two welded elements 132-3 are welded to the welded elements of the two adjacent flat wire patterns. The welding portion may be insulated using an insulating paper or material or the like.

As seen in FIGS. 2 and 3, a shape of the modified flat wire pattern 132 is substantially similar to a shape of the basic flat wire pattern 131, but only the distances in pitch are different in the components of the two straight flat wires. The modified flat wire pattern 132 is stacked immediately before a position at which flat wire pattern stacking starts.

Since the distance in pitch of the modified flat wire pattern 132 is one pitch less or greater than that of the basic flat wire pattern 131, a spatial collision in the horizontal direction is prevented at a portion at which the flat wire pattern stacking start position and the modified flat wire pattern 132 meet. Here, the spatial collision in the horizontal directions means that portions at which the two flat wire patterns meet each other in the horizontal direction in the slot 112 of the stator core 110 overlap.

For example, in the basic flat wire patterns 131 in which the stator core has a distance of 48 pitches, a distance between components of the two straight flat wires is 6 pitches, and a distance between the two welded elements is 3 pitches, when the welded elements are wound, connected, and stacked thereon, since a position of the slot at which stacking starts is the same as a position of the slot at which the stacking completes one round and meets the position of the stacking start slot, a collision in the horizontal direction occurs at this portion.

Accordingly, in a section in which the basic flat wire patterns 131 meet a starting portion from which stacking starts, when the modified flat wire pattern 132 which has the distance of one pitch less or greater than that of the basic flat wire pattern 131 is stacked instead of the basic flat wire pattern 131, a collision in the horizontal direction may be prevented in the section in which the basic flat wire patterns 131 meet the stacking start portion.

Meanwhile, according to another embodiment of the present invention, both ends of a U- or V-shaped hair-pin element 131-2 or 132-2 of a basic flat wire pattern 131 or a modified flat wire pattern 132 may be formed to be twisted so as to prevent a spatial collision in horizontal and vertical directions between the intersecting flat wire patterns.

Since the flat wire patterns of flat wires 130 having a U-phase, a V-phase, and a W-phase intersect with each other and are stacked on slots 112 of a stator core 110, the flat wire patterns having the phases overlap the other adjacent flat wire patterns at both ends of the U- or V-shaped hair-pin element 131-2 or 132-2, a spatial collision in the horizontal direction occurs at the overlapping portion, and thus an area of a motor increases.

To solve such a problem, in the present invention, parts of both end portions of the U- or V-shaped hair-pin elements 131-2 or 132-2 of the basic flat wire pattern 131 or the modified flat wire pattern 132 are twisted, and the twisted parts are inserted into the twisted parts of the both ends of the U- or V-shaped hair-pin element of the flat wire pattern having the other phase, and thus a spatial collision in the horizontal direction is prevented.

Meanwhile, according to another embodiment of the present invention, two welded elements 131-3 and 132-3 of a basic flat wire pattern 131 or a modified flat wire pattern 132 may be formed as forward-direction welded elements or reverse-direction welded elements.

In the forward-direction welded elements, the two welded elements 131-3 or 132-3 are formed in opposite directions and used for forward or reverse-direction stacking. In the reverse-direction welded elements, the two welded elements 131-3 or 132-3 are formed in one direction, and used at a portion in which a stacking direction is reversely changed from a forward direction to a reverse direction.

FIGS. 2A and 3A are views illustrating the forward-direction welded elements in which the two welded elements are formed in the opposite directions, and the FIGS. 2B and 3B are view illustrating the reverse-direction welded elements in which the two welded elements are formed in one direction.

Figure 4:
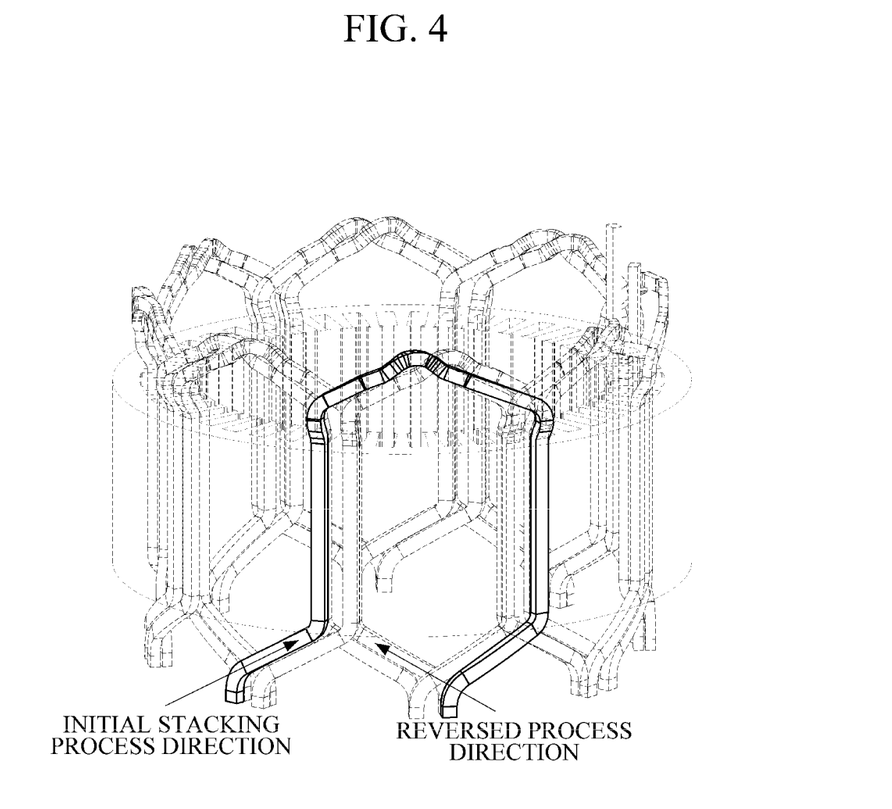
FIG. 4 shows a view in which a stacking direction of the flat wire pattern of the motor with a flat wire according to the present invention is reversely changed in an opposite direction.

As illustrated in FIG. 4, when the basic flat wire patterns 131 or the modified flat wire patterns 132 are stacked in the forward direction or reverse direction, the stacking direction of the flat wire patterns may be reversely changed as necessary, and the basic flat wire patterns 131 or modified flat wire patterns 132 may be stacked.

In a portion in which the stacking direction is reversely changed, the basic flat wire pattern or the modified flat wire pattern having the reverse-direction welded elements in which the two welded element are formed in one direction is used to change a stacking direction to an opposite direction, and the flat wire patterns are stacked, and in the remaining portion, the basic flat wire pattern or the modified flat wire pattern having the forward-direction welded elements in which the two welded elements are formed in opposite directions from each other are used to be stacked.

Meanwhile, according to another embodiment of the present invention, flat wires 130 further include exceptional flat wire patterns 133. The exceptional flat wire patterns 133 are stacked on separate layers which are different from stack layers on which basic flat wire patterns 131 and modified flat wire patterns 132 intersect with each other and are stacked to prevent a spatial collision in a horizontal direction to decrease the number of slot stack layers.

Figure 5:
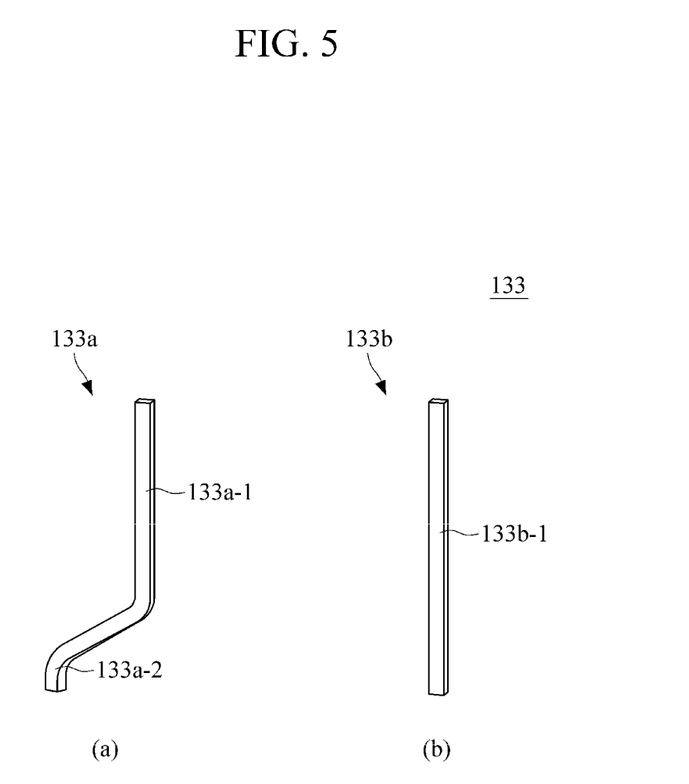
FIG. 5 is a view illustrating an exceptional flat wire pattern of the motor with a flat wire according to one embodiment the present invention.

Here, the exceptional flat wire patterns 133 include power input flat wire patterns 133a connected to power input terminals and power output flat wire patterns 133b connected to power output terminals. FIG. 5 is a view illustrating the exceptional flat wire pattern of the motor with a flat wire according to one embodiment the present invention.

FIG. 5A is a view illustrating the power input flat wire pattern, and the power input flat wire pattern 133a includes a straight flat wire element 133a-1 and one welded element 133a-2.

The straight flat wire element 133a-1 is stacked on the separate layer which is different from the stack layers on which the basic flat wire patterns 131 and the modified flat wire patterns 132 intersect with each other and are stacked, and an upper end thereof is connected to the power input terminal. Here, the upper end of the straight flat wire element 133a-1 may also be twisted as necessary.

One end of the one welded element 133a-2 is integrally connected to a lower end of the straight flat wire element 133a-1, and the other end is electrically connected to the adjacent flat wire pattern and has a distance of n/2 pitches.

FIG. 5B is a view illustrating the power output flat wire pattern, and the power output flat wire pattern 133b includes only a straight flat wire element 133b-1.

The straight flat wire element 133b-1 is stacked on the separate layer which is different from the stack layers on which the basic flat wire patterns 131 and the modified flat wire patterns 132 intersect with each other and are stacked, and an upper end thereof is connected to the power output terminals and a lower end is electrically connected to the adjacent flat wire patterns. Here, the upper end of the straight flat wire element 133b-1 may also be twisted as necessary.

When the exceptional flat wire patterns 133 are not positioned on the separate layers and are positioned on the other stack layers, a spatial collision in a horizontal direction may occur between the basic flat wire patterns 131 or the modified flat wire patterns 132. However, in a case in which the exceptional flat wire patterns are separately stacked on the separate layers of slots 112 of stator core 110, a spatial collision in a horizontal direction does not occur between the basic flat wire patterns 131 or the modified flat wire patterns 132, the spatial collision in the horizontal direction is prevented, and thus the number of slot stack layers is decreased.

Meanwhile, a shape of the power input flat wire pattern 133a and a shape of the power output flat wire pattern 133b are not limited to the above-described shapes and may be suitably modified according to terminal structures of bus bars connected to the power input flat wire pattern 133a and the power output flat wire pattern 133b.

Figure 6:
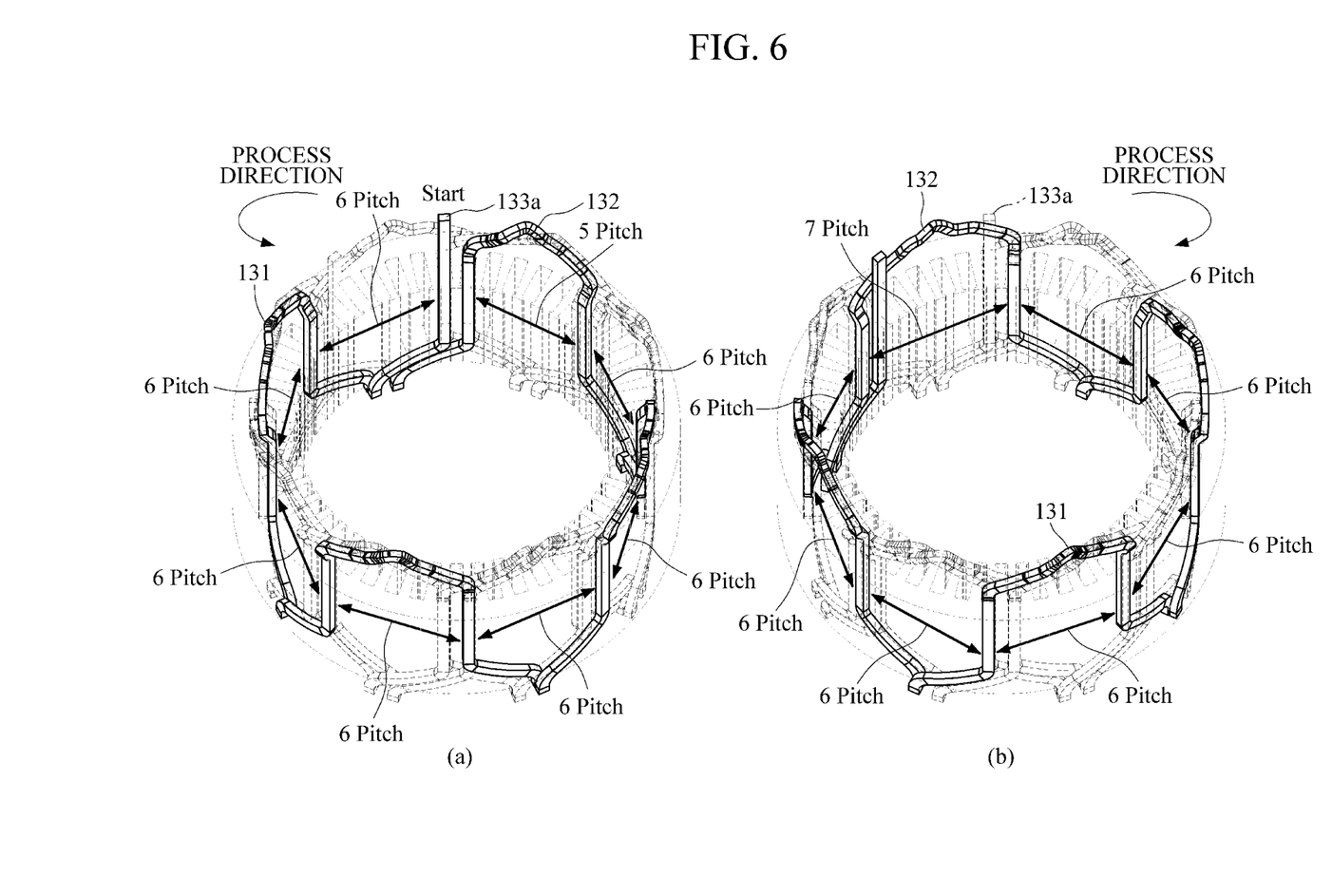
FIG. 6 is a view illustrating one example in which flat wire patterns having a U-phase are stacked on first and second layers of slots of a stator core.
Figure 7:
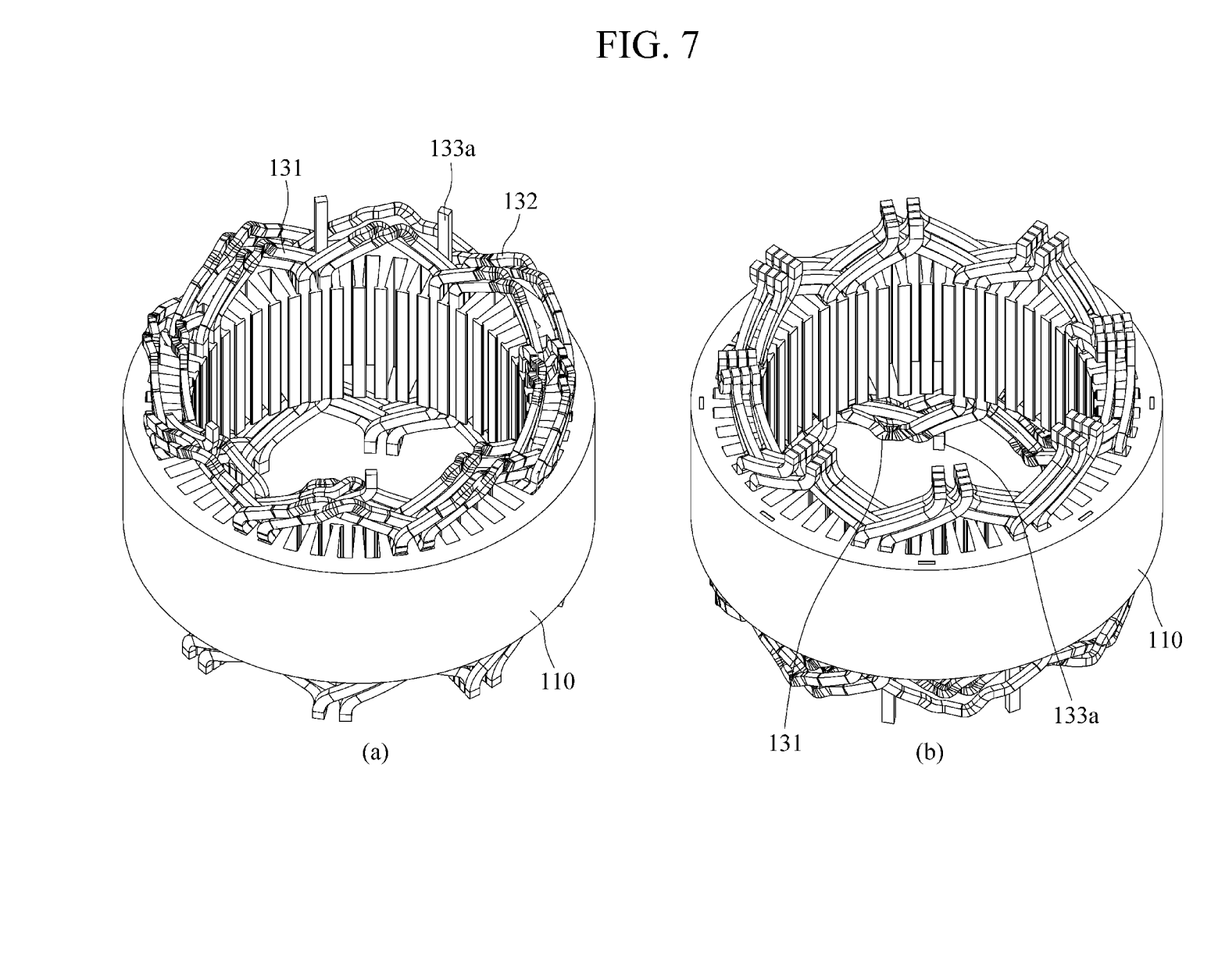
FIG. 7 is a view illustrating one example in which the flat wire patterns having the U-phase are stacked on the first and second layers and fourth and fifth layers of the slots of the stator core.

A stacking operation of the flat wire patterns of the motor with a flat wire according to the present invention will be described with reference to FIGS. 6 and 7. FIG. 6 is a view illustrating one example in which the flat wire patterns each having a U-phase are stacked on first and second layers of the slots of the stator core. And FIG. 7 is a view illustrating one example in which the flat wire patterns having a U-phase are stacked on the first and second layers and fourth and fifth layers of the slots of the stator core.

Referring to FIG. 6, the basic flat wire patterns 131 having a U-phase and a distance of 6 pitches, the modified flat wire patterns 132 having a distance of 5 pitches and a distance of 7 pitches, and the exceptional flat wire patterns 133 are stacked on the slots 112 of the stator core 110 having 48 slots.

The straight flat wire element 133a-1 of the power input flat wire pattern 133a is inserted into a third layer of a stator core slot at a start position in FIG. 6A. Meanwhile, the welded element 133a-2, which has a distance of 3 pitches, of the power input flat wire pattern 133a is electrically connected to the welded element, which has the distance of 3 pitches, of the basic flat wire pattern 131, and one of the two straight flat wire elements 131-1 of the basic flat wire pattern 131 is inserted into a second layer of the stator core slot, and another of the two straight flat wire elements 131-1 of the basic flat wire pattern 131 is inserted into a first layer of the stator core slot.

In a state in which the welded elements having the distance of 3 pitches are electrically connected to each other, stacking starts with the power input flat wire pattern 133a and three basic flat wire patterns 131 are sequentially stacked such that one straight flat wire element 131-1 is inserted into the second layer of the stator core slot and another straight flat wire element 131-1 is inserted into the first layer of the stator core slot.

When the basic flat wire patterns are sequentially stacked after the three basic flat wire patterns 131 are stacked, the straight flat wire element 133a-1 of the power input flat wire pattern 133a overlaps the straight flat wire element of the basic flat wire pattern in the horizontal direction at the start position, and thus the number of slot stack layers increases.

In order to prevent this, the modified flat wire patterns 132 each having a distance of 5 pitches are stacked on the first and second layers to prevent a spatial collision in the horizontal direction at a portion which completes one round and meets the power input flat wire pattern 133a to decrease the number of slot stack layers.

Next, as illustrated in FIG. 6B, the modified flat wire patterns 132 each having a distance of 7 pitches are stacked on the first and second layers in order to achieve a spatial synchronization in pitch which is decreased by one pitch while the basic flat wire patterns 131 are stacked.

When the above-described process is repeated on the fourth and fifth layers of the stator core slot, as illustrated in FIGS. 7A and 7B, the basic flat wire patterns 131 and the modified flat wire patterns 132 each having a U-phase are stacked on the first, second, fourth, and fifth layers of the slots of the stator core, and the power input flat wire patterns 133a and the power output flat wire patterns 133b included in the exceptional flat wire patterns 133 are stacked on the third layer.

Figure 8:
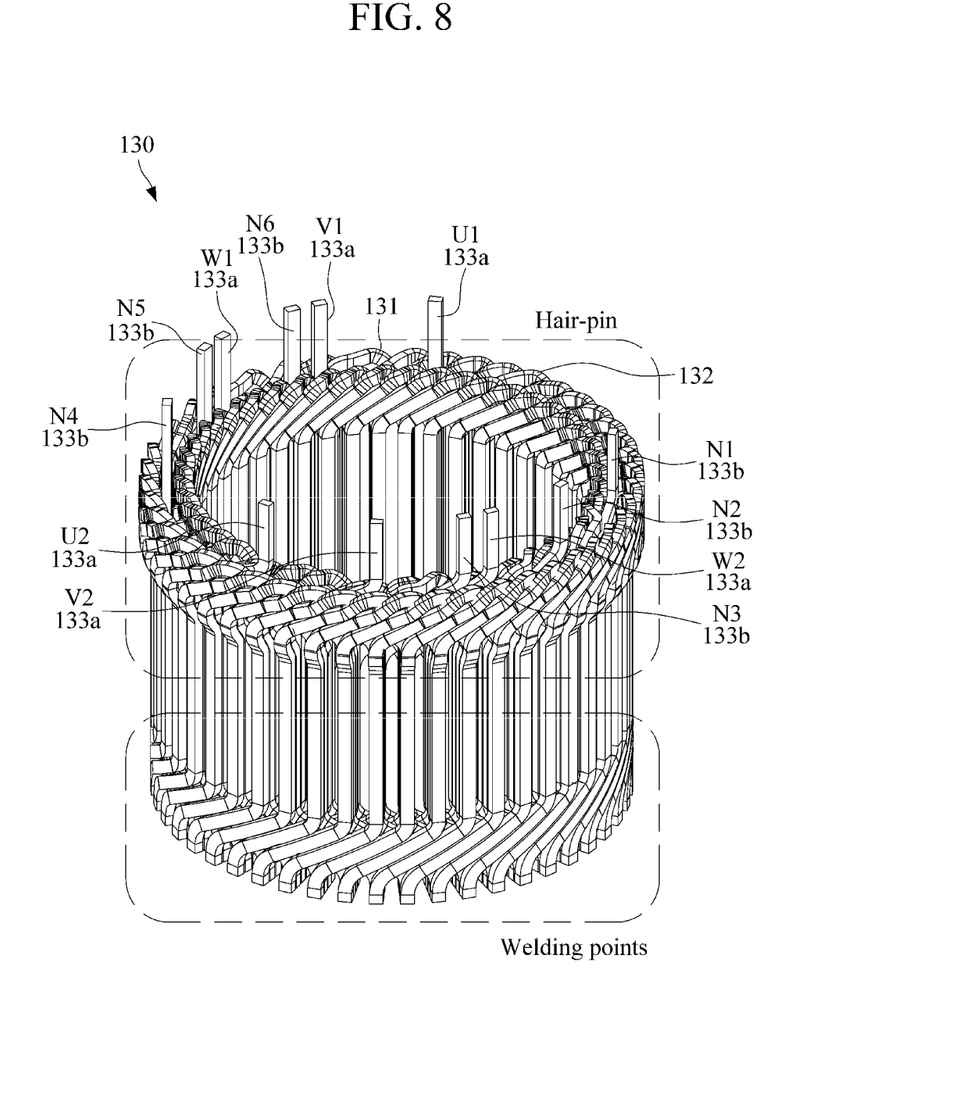
FIG. 8 is a view illustrating one example of a stacked shape of the flat wire patterns of the motor with a flat wire according to the present invention.

When the process is applied for three U-, V-, and W-phases, as illustrated in FIG. 8, the flat wire patterns having three phases are stacked on the slots of the stator core. FIG. 8 is a view illustrating one example of a stacked shape of the flat wire patterns of the motor with a flat wire according to the present invention.

Referring to FIG. 8, portions in which the basic flat wire pattern and the basic flat wire pattern intersect with each other and portions in which the basic flat wire patterns and the modified flat wire patterns intersect with each other are twisted to prevent a spatial collision. In addition, the exceptional flat wire patterns are stacked on the separate layers so that a total of six power input flat wire patterns 133a in which two power input flat wire patterns 133a are stacked for each of three U-, V-, and W-phases and a total of six power output flat wire patterns 133b in which two power output flat wire patterns 133b are stacked for each of three U-, V-, and W-phases are formed while preventing a spatial collision.

Meanwhile, when the six power output flat wire patterns 133b are connected to the power input, output, and neutral terminals of bus bars using bus bars in a terminal type in which a structure is simple and a cost is inexpensive, the motor with a flat wire illustrated in FIG. 1 is completely formed.

As described above, the above-described objective of the present invention can be achieved because a spatial collision which occurs in horizontal and vertical directions between flat wire patterns which intersect with each other and are stacked on slots of a stator core can be prevented, and it is advantageous to miniaturize a motor.

The various embodiments disclosed in this specification and drawings are only specific examples to aid in understanding of the invention and are not intended to limit various embodiments of the present invention.

Accordingly, the scope of various embodiments of the present invention should not be limited by the above-described embodiments, and all changes or modifications derived from the technical ideas of various embodiments of the present invention should be construed as being included in the scope of various embodiments of the present invention.

What is claimed is:

1. A motor with a flat wire, comprising:
  a stator core in which a plurality of teeth and slots are formed in an inner circumference thereof;
  a rotor which rotates about a center of an inner portion of the stator core as an axis and in which a plurality of magnets are attached to an outer circumference thereof; and
  flat wires which are inserted into and stacked on the plurality of slots formed in the inner circumference of the stator core to intersect with each other and include basic flat wire patterns each having a predetermined distance in pitch and modified flat wire patterns each having a distance in pitch which is different from that of the basic flat wire patterns to prevent a spatial collision in a horizontal direction at a position at which the basic or the modified flat wire pattern meets a flat wire pattern stacking start position,
  wherein each of the basic flat wire patterns includes:
  two straight flat wire elements which are inserted into the slots formed in the inner circumference of the stator core and have a distance of n pitches;
  one U- or V-shaped hair-pin element which is integrally connected to upper ends of the two straight flat wire elements to electrically connect the two straight flat wire elements, and in which a part of a central portion is twisted to prevent a spatial collision in the horizontal direction and a vertical direction between the intersecting flat wire patterns; and
  two welded elements in which one ends are integrally connected to lower ends of the two straight flat wire elements and the other ends are electrically connected to two adjacent flat wire patterns and which have a distance of n/2 pitches.

2. The motor of claim 1, wherein each of the modified flat wire patterns includes:
  two straight flat wire elements which are inserted into the slots formed in the inner circumference of the stator core and have a distance of n−1 or n+1 pitches;
  one U- or V-shaped hair-pin element which is integrally connected to upper ends of the two straight flat wire elements to electrically connect the two straight flat wire elements, and in which a part of a central portion is twisted to prevent a spatial collision in the horizontal and vertical directions between the intersecting flat wire patterns; and
  two welded elements in which one ends are integrally connected to lower ends of the two straight flat wire elements and the other ends are electrically connected to two adjacent flat wire patterns and which have a distance of n/2 pitches.

3. The motor of claim 2, wherein both ends of the U- or V-shaped hair-pin element of the basic flat wire pattern or the modified flat wire pattern are twisted to prevent a spatial collision in the horizontal and vertical directions between the intersecting flat wire patterns.

4. The motor of claim 2, wherein the two welded elements of the basic flat wire pattern or the modified flat wire pattern include forward-direction welded elements which are formed in opposite directions and used for forward-direction stacking or reverse-direction stacking.

5. The motor of claim 2, wherein the two welded elements of the basic flat wire pattern or the modified flat wire pattern include reverse-direction welded elements which are formed in one direction and used at a portion in which a stacking direction is reversed from a forward direction to a reverse direction.

6. The motor of claim 1, further comprising exceptional flat wire patterns which are stacked on separate layers which are different from stack layers on which the basic flat wire patterns and the modified flat wire patterns intersect and are stacked to prevent a spatial collision in a horizontal direction and to decrease the number of slot stack layers.

7. The motor of claim 6, wherein each of the exceptional flat wire patterns includes:
  a power input flat wire pattern connected to a power input terminal; and
  a power output flat wire pattern connected to a power output terminal.

8. The motor of claim 7, wherein the power input flat wire pattern includes:
  a straight flat wire element which is stacked on the separate layer which is different from the stack layers in which the basic flat wire patterns and the modified flat wire patterns intersect and are stacked and in which an upper end is connected to the power input terminal; and
  one welded element in which one end is integrally connected to a lower end of the straight flat wire element and the other end is electrically connected to the adjacent flat wire pattern and which has a distance of n/2 inches.

9. The motor of claim 7, wherein the power output flat wire pattern includes a straight flat wire element which is stacked on the separate layer which is different form the stack layers on which the basic flat wire patterns and the modified flat wire patterns intersect and are stacked, and in which an upper end is connected to the power output terminal and a lower end is electrically connected to the adjacent flat wire pattern.

* * * * *